United States Patent
Sasaoka

(10) Patent No.: US 7,645,529 B2
(45) Date of Patent: Jan. 12, 2010

(54) FUEL CELL CHARACTERISTIC RECOVERY METHOD AND APPARATUS

(75) Inventor: Takaaki Sasaoka, Tsuchiura (JP)

(73) Assignee: Hitachi Cable, Ltd., Tokyo (JP)

(*) Notice: Subject to any disclaimer, the term of this patent is extended or adjusted under 35 U.S.C. 154(b) by 885 days.

(21) Appl. No.: 11/134,509

(22) Filed: May 23, 2005

(65) Prior Publication Data

US 2006/0014060 A1    Jan. 19, 2006

(30) Foreign Application Priority Data

Jun. 21, 2004 (JP) ............... 2004-183071
Feb. 10, 2005 (JP) ............... 2005-035287

(51) Int. Cl.
*H01M 8/00* (2006.01)
*H01M 8/10* (2006.01)

(52) U.S. Cl. .................. 429/12; 429/13; 429/30

(58) Field of Classification Search .......... 429/21, 429/12, 13, 30
See application file for complete search history.

(56) References Cited

U.S. PATENT DOCUMENTS 6,399,231 B1   6/2002  Donahue et al.
7,432,002 B2 * 10/2008  Kumar et al. ............. 429/13

FOREIGN PATENT DOCUMENTS

JP    2003-536232 A    12/2003
JP    2004-158437 A    6/2004
WO    WO 2004/030118   * 4/2004

* cited by examiner

*Primary Examiner*—Patrick Ryan
*Assistant Examiner*—Julian Mercado
(74) *Attorney, Agent, or Firm*—Foley & Lardner LLP

(57) ABSTRACT

A characteristic recovery apparatus is provided with a DMFC having anode and cathode electrodes; anode-side and cathode-side separators for feeding the anode and cathode electrodes with pure water or a solution and an oxygen-containing gas, respectively; a voltage-applying means for forcing current to flow between the electrodes in the same direction as a direction of current flow during power generation of the fuel cell; and a control means for controlling the voltage-applying means.

7 Claims, 2 Drawing Sheets

FUEL CELL CHARACTERISTIC RECOVERY METHOD AND APPARATUS

The present application is based on Japanese patent application Nos. 2004-183071 and 2005-035287, the entire contents of which are incorporated herein by reference.

BACKGROUND OF THE INVENTION

1. Field of the Invention

The present invention relates to a fuel cell characteristic recovery method and apparatus, and particularly, a characteristic recovery method and apparatus for direct methanol fuel cells used in mobile and portable power supplies, electric automobile power supplies, home cogeneration systems, etc.

2. Description of the Related Art

From the point of view of global environmental protection, and the like, expectations for fuel cells have recently been rapidly raised. Fuel cells are generally classified according to kinds of electrolytes used into five kinds of solid oxide fuel cells (SOFCs), molten carbonate fuel cells (MCFCs), alkaline fuel cells (AFCs), phosphoric acid fuel cells (PAFCs), polymer electrolyte fuel cells (PEFCs), etc.

Among others, polymer electrolyte fuel cells (hereinafter, "PEFCs") with a polymer electrolyte membrane sandwiched between two electrodes, in which these members are further sandwiched between separators, are remarkable because of their compact structure, excellent power generation efficiency and relatively low-temperature operation, thereby having a wide range of applications.

Also, among PEFCs, particularly, direct methanol fuel cells (hereinafter, "DMFCs") are recently remarkable, which, instead of a hydrogen gas, uses a methanol solution directly as fuel. DMFCs generate power by causing an electrochemical reaction of a fuel containing methanol and water, and an oxygen-containing oxidizer gas such as air. DMFCs have various application fields. For instance, because they operate at room temperature and can be made small and sealed, they can be used in pollution-free automobiles, home power generation systems, mobile communication equipment, medical equipment, etc.

A DMFC comprises, basically, as a unit cell (hereinafter, "cell"), a stacked body having conductive separators stacked on both sides of a membrane electrode assembly (hereinafter, "MEA"). The MEA consists of three layers in which an electrolyte membrane comprising an ion exchange resin or like is sandwiched between a pair of electrodes constituting anode and cathode electrodes. The pair of electrodes each consists of an electrode catalyst layer in contact with the electrolyte membrane, and an outer fuel or oxidizer gas diffusion layer (dispersion layer) of the electrode catalyst layer. The conductive separators are stacked so as to come into contact with the diffusion layer (dispersion layer) of the MEA, and are formed with manifold apertures which serve as passages for a fuel or oxidizer gas to flow into the diffusion layer (dispersion layer), separator temperature adjustment, waste removal, etc. Such fuel cells generate power by causing an electrochemical reaction, for example, when a mixture of methanol and water is caused to flow through the manifold apertures in contact with the diffusion layer (dispersion layer) of the anode electrode, while an oxidizing gas such as oxygen, air, or the like is caused to flow through the manifold apertures in contact with the diffusion layer (dispersion layer) of the cathode electrode.

In fuel cells including DMFCs, it is well known that continuing power generation would cause its power generation characteristic degradation, i.e., performance degradation such as a current density fall under a constant voltage.

Because such power generation characteristic degradation causes an obstacle in practical use of fuel cells, such as an increase in maintenance cost due to a short lifetime, there is a need for a method for rapidly and conveniently recovering the degraded power generation characteristic.

As a method for recovering the degraded power generation characteristic, there is known a method described in PCT Japanese Publication No. 2003-536232. PCT Japanese Publication No. 2003-536232 discloses a method for recovering the degraded performance of a proton exchange membrane (PEM) fuel cell by periodically reducing a cathode potential below approximately 0.6 V.

However, PCT Japanese Publication No. 2003-536232 only shows one method for recovering the degraded performance of a PEM fuel cell, so that there is a desire for a still more convenient and more widely applicable method.

SUMMARY OF THE INVENTION

Accordingly, it is an object of the present invention to provide a fuel cell characteristic recovery method and apparatus, which can, in fuel cells including DMFCs, facilitate recovering the degraded power generation characteristic rapidly and conveniently.

To achieve the above object, the present invention provides a fuel cell characteristic recovery method, comprising the steps of: feeding an anode electrode of a fuel cell with pure water or a solution; feeding a cathode electrode of the fuel cell with an oxygen-containing gas; and forcing current to flow between the electrodes in the same direction as that of current flow during power generation of the fuel cell.

The features in the preferred embodiments of the invention are as follows:

(1) The above current forcing is performed preferably using a DC (direct current) power supply.
(2) The above current forcing is performed preferably with a current density of 300-3000 mA/cm$^2$.
(3) The above current forcing is performed preferably using an AC (alternating current) power supply.
(4) The above current forcing is performed preferably until before the MEA temperature of the fuel cell reaches 100° C., or until before the maximum applied voltage per cell of the fuel cell reaches 3 V.
(5) The above oxygen-containing gas is preferably pure oxygen, air, or a nitrogen gas containing 0.001-1% of oxygen.
(6) The above fuel cell is preferably a DMFC.

To achieve the above object, the present invention provides a fuel cell characteristic recovery apparatus, comprising: a fuel cell having anode and cathode electrodes; characteristic recovery medium feed means for feeding the anode and cathode electrodes with pure water or a solution and an oxygen-containing gas, respectively; a voltage-applying means for forcing current to flow between the electrodes in the same direction as that of current flow during power generation of the fuel cell; and a control means for controlling the characteristic recovery medium feed means and the voltage-applying means.

The features in the preferred embodiments of the invention are the same as above (1)-(6).

The characteristic recovery method and apparatus according to the invention allow recovering the degraded fuel cell power generation characteristic rapidly and conveniently, and particularly, can realize recovery of the degraded DMFC power generation characteristic.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

Figure 1:
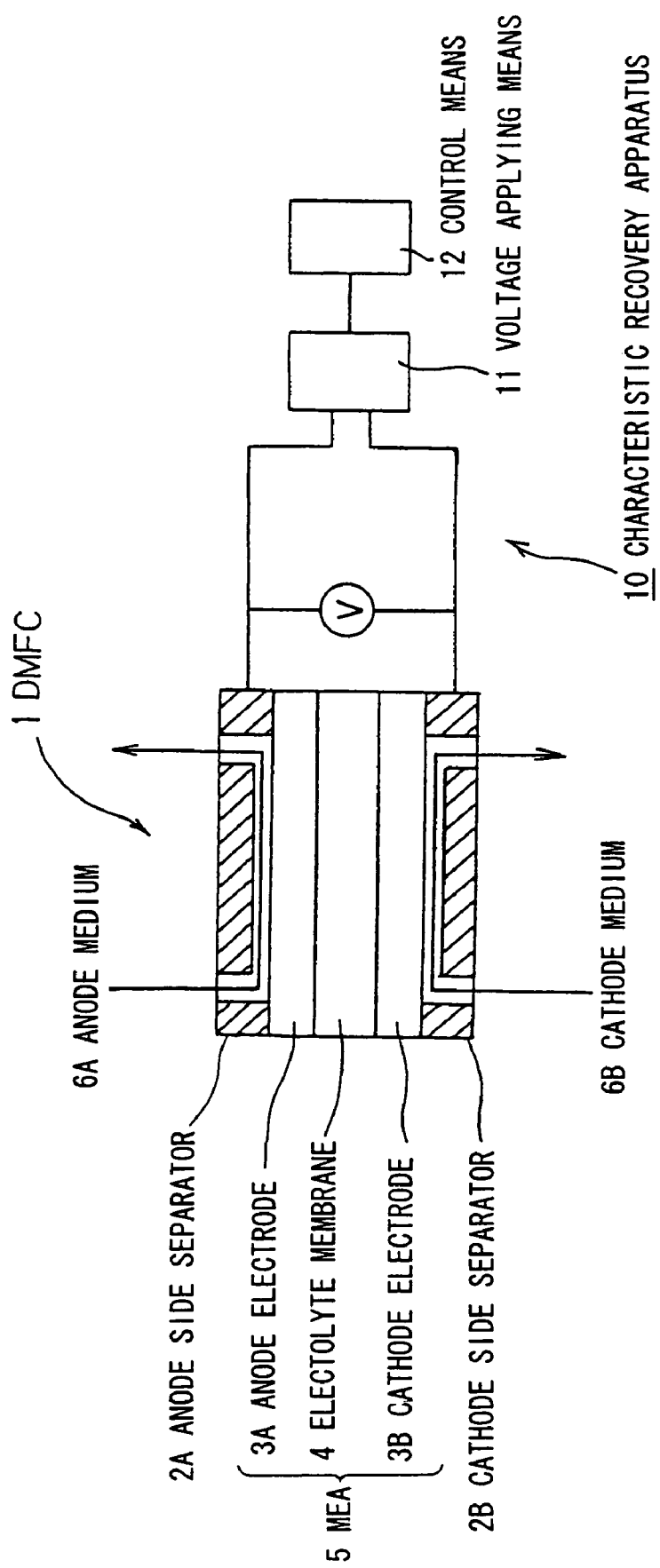
FIG. 1 is a diagram illustrating a schematic configuration of a characteristic recovery apparatus according to an embodiment of the invention.

FIG. 1 illustrates a schematic configuration of a characteristic recovery apparatus according to an embodiment of the invention. This characteristic recovery apparatus 10 schematically comprises a DMFC 1 to be recovered in the characteristic; a voltage-applying means 11 as an electric field-applying means for forcing current to flow by applying voltage to the DMFC 1; and a control means 12 for controlling the voltage-applying means 11. Further, the DMFC 1 may be integrated with or separated from the voltage-applying means 11, etc. Also, although here is explained the DMFC that has particularly remarkable effects, the invention is not limited thereto, but may be applied to fuel cells requiring characteristic recovery. It is preferably applied to polymer electrolyte fuel cells, and particularly to DMFCs.

The DMFC 1 may be a well-known DMFC, and that cell comprises anode- and cathode-side separators 2A and 2B, anode and cathode electrodes 3A and 3B; and an electrolyte membrane 4. The anode and cathode electrodes 3A and 3B and electrolyte membrane 4 constitute an MEA 5 which is sandwiched between the anode- and cathode-side separators 2A and 2B. The DMFC 1 is generally used by connecting a plurality of cells in series according to target electromotive force.

The anode and cathode electrodes 3A and 3B each comprises a support layer for feeding and diffusing (dispersing) a fuel or an oxidizer gas, and a catalyst layer for oxidization or reduction reactions to occur. In the anode electrode 3A, by an oxidization reaction of in ethanol and water fed, hydrogen ions, electrons, and carbon dioxide are produced, and the hydrogen ions produced are conducted through the electrolyte membrane 4 to the cathode electrode 3B, while the electrons produced are conducted through an external circuit to the cathode electrode 3B. In the cathode electrode 3B, water is produced by a reduction reaction of hydrogen and oxygen ions.

For a polymer electrolyte membrane of the electrolyte membrane 4, a thin membrane (thickness: the order of 50-100 μm) may be used having a perfluorocarbon sulfonic acid structure having a sulfonic acid group as an ion exchange membrane, for example, although not limited thereto, to allow fabricating a compact cell.

The anode-side separator 2A is formed with a fuel feed groove for feeding a fuel to the adjacent anode electrode 3A, while the cathode-side separator 2B is formed with an oxidizer gas feed groove for feeding an oxidizer gas to the adjacent cathode electrode 3B, so that a fuel and oxidizer gas are fed along the surfaces of the separators 2A and 2B, respectively.

For the separators 2A and 2B, there may be suitably used a carbon separator, a carbon compound-molded separator with carbon kneaded into resin, a metallic separator having on its surface a corrosion-resistant layer formed of titanium, stainless steel or noble metals, etc., although not limited thereto.

Based on a command from the control means 12, the voltage-applying means 11 applies voltage to the DMFC 1 to thereby force current to flow therein. Using a DC (direct current) power supply is preferred, but an AC (alternating current) power supply may be used. Also, the control means 12 is provided with a CPU, etc., which controls characteristic recovery, as described later.

A characteristic recovery method according to an embodiment of the invention will be explained next. As the characteristic recovery method, its procedure is as follows:

1. An anode medium 6A is fed to the anode electrode 3A of the DMFC 1, while a cathode medium 6B is fed to its cathode electrode 3B. This feed method may be any method for feeding in a natural flow even in the case of forced circulation.
2. A DC power supply (voltage-applying means 11) is prepared. The anode electrode 3A of the DMFC 1 is connected to a positive terminal of the DC power supply output, while its cathode electrode 3B is connected to a negative terminal of the DC power supply output. Such connection allows forcing current to flow through the MEA 5 in the same direction as that during normal power generation. An AC power supply may be used.
3. Using the DC power supply, current is forced to flow through the DMFC 1. The current forcing conditions are as follows: For current, the current density $J_e$ per electrode surface area of the MEA 5 is within a range of 300-3000 mA/cm$^2$; the voltage between the terminals per cell of the DMFC 1 is 0.3-3 V; and the current flow time is a few seconds to a few minutes. An AC power supply of ±3000 mA/cm$^2$ or less may be used in current forcing. During current flowing, the anode is fed so as not to run out of water content in the anode side. By repeating this plural times, the DMFC 1 characteristic recovery process is completed.

The characteristic recovery method according to the embodiment of the invention will be explained in more detail below.

(1) Anode Medium 6A

For the anode medium 6A, water or a methanol solution is used. In actual DMFC power generation, since the methanol concentration is used on the order of 0.1-10 mol/l, filling a methanol solution of this concentration range is preferred. On the other hand, even in the case of use of pure water, if after current forcing for characteristic recovery, it is replaced with a methanol solution for DMFC power generation, pure water may be used, but in order to save labor and time in the replacement, it is preferred to use a methanol solution which is typically used as the fuel. Also, the essential point of the invention is considered to lie in the electrolysis of water, and any solution in which the MEA 5 is not damaged by the anode medium 6A may therefore be used without being limited to water and a methanol solution. For instance, there may be used an ethanol solution, isopropyl alcohol solution, etc. As its feed method, there are a method for attaching a solution tank to the anode electrode 3A, a method for feeding a solution by forced circulation, and so on, without a particular limitation. Apart from the electrolysis of water, the essential point of the invention is also considered to be related to the synthesis of water, and the effects of the invention are exhibited by a combined action of both.

(2) Cathode Medium 6B

For the cathode medium 6B, an oxygen-containing gas such as air (an oxygen-containing nitrogen gas) is fed. The oxygen content may be as high as the concentration of a pure oxygen gas, or be as low as a concentration of the order of 0.001-1%, without a particular limitation. Any oxygen-containing gas may be used, and the oxygen concentration and the kinds and concentrations of other gases contained may be selected appropriately from the point of view of convenience, economy, etc. As its feed method, there are a feed method by a natural breathing DMFC structure in which the cathode electrode 3B is left unattended in atmosphere, a method for feeding a gas by forced circulation, and so on, without a particular limitation.

(3) Current Density $J_e$ in Current Forcing

In actual DMFC power generation, power is generated typically in a range of the order of 0-200 mA/cm². Current forcing requires a current flow of more than a load current density assumed in actual DMFC power generation, and it is therefore preferred to force constant current whose current density is within a range of 300-3000 mA/cm², more preferably, 350-2000 mA/cm², still more preferably, 400-1500 mA/cm², and most preferably, 450-1400 mA/cm². Too small a current density would have no effect, while too large a current density would cause thermal destruction to the MEA 5. At a current density of 2500 mA/cm² or higher, in order to prevent thermal destruction of the MEA 5, it is preferred to cool the cell, or reduce current flow time (e.g. to a few seconds) in current forcing. From the point of view of convenience, etc., it is preferred to force constant current whose value is within the above range.

In the case of use of an AC power supply, it is preferred to force current whose current density is within a range of ±3000 mA/cm², more preferably, ±2000 mA/cm², still more preferably, ±1500 mA/cm², and most preferably, ±1400 mA/cm².

Even in case of too small a current density, the effects of the invention can be enhanced by increasing current flow time or the number of times of repeating current flow.

(4) Applied Voltage V in Current Forcing

During current flow, it is preferred to apply, as the voltage between the electrodes per cell, a voltage of 0.3-3 V, more preferably, 0.6-2.7 V, and still more preferably, 0.9-2.5 V. Too small a voltage would cause no electrolysis, which therefore has little characteristic recovery effect. Too large a voltage can result in an undesirable thermal or electrical damage.

(5) Current Flow Time t and the Number of Times of Current Forcing

The current flow time is preferably a few seconds to a few minutes. Too short a current flow time would have no effects. Too long a current flow time would undesirably result in an increase of the temperature of the MEA 5 due to heat generation, and consequently, in an electrochemical reaction (e.g. corrosion) of the separators progressing. The proper current flow time is a current flow time until before the temperature of the MEA 5 reaches 100° C., or until before the maximum voltage per cell during constant current forcing reaches 3 V, at which the current flow is zero. It is preferred to repeat such operation 2-6 times, more preferably, 3-5 times. Repeating current flow would make voltage at the start of current flow lower than voltage at the preceding start of current flow, but it is preferred to repeat current flow until almost no voltage reduction is caused, and more preferably, until before no voltage reduction is caused. In other words, it is preferred to repeat current flow until the cell internal resistance stabilizes. For example, if the voltage at the fourth start of current flow is substantially the same as the voltage at the third start of current flow, it is preferred to complete the characteristic recovery process at the third current forcing.

Figure 2:
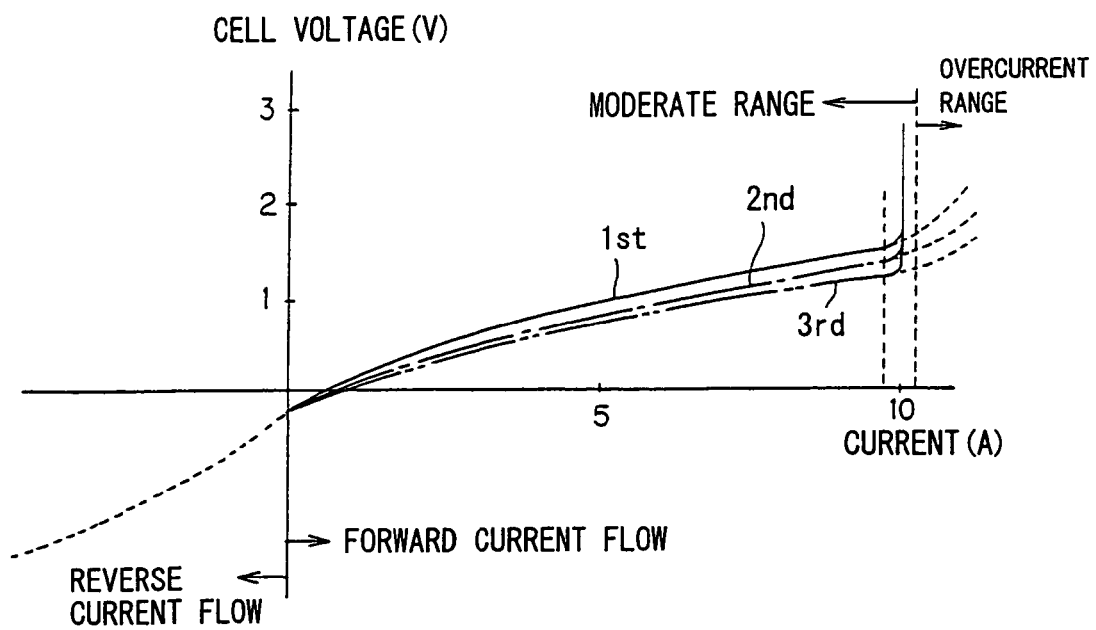
FIG. 2 is a diagram showing current-voltage curves during characteristic recovery according to the invention.

(6) The Conditions for the Applied Voltage V, Forced Current I (Current Density $J_e$) and Current Flow Time t in (3)-(5) Above are Determined by the Following Steps of:

(a) measuring applied voltage V and forced current I of a cell and monitoring V-I characteristics;
(b) increasing current and voltage by a DC power supply (FIG. 2);
(c) forcing constant current in a current-voltage range below a point (around 10 A in FIG. 2) at which dV/dI of the current-voltage graph increases sharply with increasing current, (hereinafter, "moderate range"). FIG. 2 shows current-voltage curves during characteristic recovery according to the invention, where a constant current of approximately 10 A is forced to flow. It is also possible to apply a current-voltage range exceeding the moderate range, (hereinafter, "overcurrent range"), by adjusting forced current flow time or cooling.
(d) stopping the current flow when the temperature of the MEA 5 reaches 70-100° C., or when the maximum voltage per cell during constant current forcing reaches 1-3 V. The current flow time at which this is done is taken to be $t_1$.
(e) repeating steps (c) and (d) 3-6 times, making sure that the temperature of the MEA 5 is decreased below 50° C., or below a temperature immediately after current is caused to flow. In order to reduce wait time, forced cooling may be performed. The repeated current flow time is varied according to the temperature of the MEA 5 at the repeated starts of current flow.

(7) Instead of (6) Above where the Conditions for the Applied Voltage V, Forced Current I (Current Density $J_e$) and Current Flow Time t are Determined, Current May be Caused to Flow with the Values of V, I, and t which Satisfy the Following (1)-(3):

$$\Delta T < 100 \tag{1}$$

$$T_2 < 100 \tag{2}$$

$$q < 100 \tag{3}$$

$$\Delta T = (V_1 + V_2)/2 \times I \times t / (C_2 \cdot \rho_2 \cdot v_a) \tag{4}$$

$$q = V \times I / S [W/cm^2] \tag{5},$$

where
$\Delta T$: an estimated value for a temperature rise due to current flow [° C.]
$T_1$: the temperature of the MEA 5 before current flow [° C.]
$T_2$: the temperature of the MEA 5 immediately after end of current flow [° C.]
$V_1$: the applied voltage immediately after start of constant current flow
$V_2$: the applied voltage immediately before end of constant current flow
$C_2$: the specific heat of the anode injection solution [J/(g·K)]
$\rho_2$: the density of the anode injection solution [g/cm³]
$v_a$: the anode injection solution amount per one MEA [cm³/sec]
S: the electrode surface area of the MEA [cm²]

When the temperature $T_1$ of the MEA 5 is on the order of room temperature (25-30° C.), it is preferred that $\Delta T < 60$-70.

The reason for $\Delta T$ [° C.]<100 is because, at $T_1 > 0$, the maximum temperature of the MEA 5 does not exceed 100° C. The reason for q [W/cm²]<100 is because q [W/cm²]>100 would cause an interface transition from nuclear boiling to membrane boiling, which would result in poor heat dissipation, and further produce a boiling membrane in an anode interface which would undesirably inhibit electrolysis of water.

(8) dV/dI Characteristics During Current Forcing

It is preferred to cause large current to flow by applying as small a voltage as possible. To this end, it is preferred to cause constant current flow whose value is below the moderate range.

Figure 3:
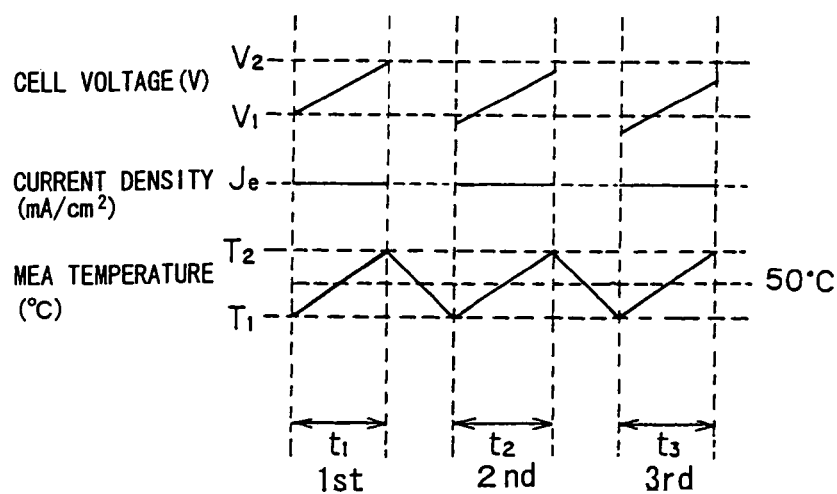
FIG. 3 is a time chart during characteristic recovery according to the invention.

FIG. 3 is a time chart during characteristic recovery according to the invention, and shows the case of three-time constant current (current density $J_e$ [mA/cm$^2$]) forcing in the above conditions.

The above characteristic recovery method allows quick and convenient recovery of the degraded fuel cell power generation characteristic. Because of the specified current flow, characteristic recovery is also made possible with the DMFC 1 incorporated into equipment.

EMBODIMENT (1) Making a Fuel Cell for Experiment

As separators for a DMFC, metal cladding sheet materials having corrosion resistance and surface conductivity is fabricated. Using a composite metallic member of Ti/SUS/Ti in which stainless steel (SUS 304) is used as the core metal and metal titanium is used as the cladding metal, surface treatment is performed on this member for having combined conductivity and corrosion resistance, by the method disclosed in Japanese patent application laid-open No. 2004-158437. Using this metallic member and an MEA (Nafion (registered trademark) used as the electrolyte membrane), a cell with an electrode surface area S=8.4 cm$^2$) is assembled.

(2) Characteristic Degradation Factors and Comparison Measurements

In DMFCs, because its power generation characteristic is significantly low and unstable immediately after fuel cell assembling, about 3-40 hour-power generation at a higher temperature (typically, about 60-80° C.) than room temperature is required as initial preconditioning interim operation (hereinafter, "aging") after DMFC assembling. This allows higher cell output than the power generation characteristic immediately after the assembling. Accordingly, as aging, 8 hour-DMFC power generation at 60° C. is performed on the cell assembled. At room temperature, using a 1 mol/l methanol solution as the anode fuel and air as the cathode feed gas, taking air utilization ratio as 10%, at a load of 100 mA/cm$^2$, DMFC continuous power generation is performed on the cell after the aging using air as the cathode feed gas. The power generation characteristic immediately after the start of the continuous operation is 25 mW/cm$^2$ (comparison measurement ref$_1$), but after 100 hour continuous operation, the power generation characteristic is reduced to 10 mW/cm$^2$ (comparison measurement ref$_2$). Subsequently, the power generation is stopped, and the cathode side is dried by causing dry air to flow therein for 1 hour. Again, in the same conditions, the power generation characteristic is measured. As a result, it is verified that the power generation characteristic is the same as the power generation characteristic immediately after the start of the continuous operation, 25 mW/cm$^2$. This determines that the characteristic degradation factor due to the 100 hour continuous operation is due to flooding.

Using pure oxygen (oxygen left after removing inevitable impurities, hereinafter same) as the cathode feed gas, 8 hour-aging at 60° C. is also performed on a cell assembled separately. At room temperature, using a 1 mol/l methanol solution as the anode fuel and pure oxygen as the cathode feed gas, taking cathode feed gas utilization ratio as 10%, at a load of 100 mA/cm$^2$, DMFC continuous power generation is performed on the cell after the aging. The power generation characteristic immediately after the start of the continuous operation is 30 mW/cm$^2$ (comparison measurement ref$_3$), but after 100 hour continuous operation, the power generation characteristic is reduced to 12 mW/cm$^2$ (comparison measurement ref$_4$).

(3) Current Forcing Experiment 1

Aging in the same conditions as (2) above (8 hour-DMFC power generation at 60° C.) is performed on a cell assembled in the same conditions as (1) above, and is followed by 100 hour continuous power generation to fabricate a cell whose characteristic is degraded by flooding. During this aging and subsequent 100 hour continuous power generation, there are prepared samples (samples 1-9) using air as the cathode feed gas, and a sample (sample 10) using pure oxygen as the cathode feed gas. Using samples 1-10, this current forcing experiment is performed. In this experiment, the anode injection solution amount is taken to be $v_a$=1 [cm$^3$/sec]. Also, the specific heat of the anode injection solution is taken to be the value of water as a representative value, $C_2$=4.2 [J/(g·K)] and $\rho_2$=1.0 [g/cm$^3$]. Accordingly, since I=electrode surface area S×forced current density $J_e$, substituting into equation (4) above, it follows that $\Delta T=(V_1+V_2)/J_e \times t$.

A DC power supply is prepared. The anode electrode of the DMFC is connected to a positive terminal of the DC power supply output, while its cathode electrode is connected to a negative terminal of the DC power supply output. In the conditions shown in Table 1, current is forced to flow in the same direction as that during normal power generation, so that the current density is constant. In each sample, the number of times of current forcing is three. Using a methanol solution (1.0 mol/l, 3.0 mol/l, 10.0 mol/l) as the anode feed solution and air (samples 1-5), a nitrogen gas containing 0.001-1% of oxygen (samples 6-9) or pure oxygen (sample 10) as the cathode feed gas, the experiment is implemented by forcing each of them to circulate. The DMFC power generation characteristic assessment of the samples in which current is forced is performed at room temperature 25° C., using air (samples 1-9) and pure oxygen (sample 10) as the cathode feed gas, and taking the cathode feed gas utilization ratio as 10%. The assessment results are shown in Table 1. Table 1 shows forced current conditions, and maximum outputs obtained for the DMFC power generation characteristic after the current forcing. The maximum outputs are converted into values per MEA electrode surface area. Table 1 also shows voltage $V_1$ immediately after the start of the constant current forcing and voltage $V_2$ immediately before the end of the current flow. In Table 1, $\Delta T$ is the calculated values, and $T_1$ and $T_2$ are the measured values.

TABLE 1

Assessment results of the characteristic recovery experiment

| Sample No. | anode injection solution $v_a$ (mol/l) | Current-forcing conditions | | | | | DMFC power generation characteristic (25° C.) maximum output (mW/cm²) |
|---|---|---|---|---|---|---|---|
| | | current density $J_e$ (mA/cm²) | applied voltage $V_1$ (V) | applied voltage $V_2$ (V) | current flow time t (sec) | $\Delta T$ (° C.) $T_1$ (° C.) $T_2$ (° C.) | |
| 1 | methanol solution (1.0) | 150 | 0.6 | 0.7 | 200 | $\Delta T = 39$ $T_1 = 30$ $T_2 = 80$ | 10 |
| 2 | methanol solution (1.0) | 300 | 0.9 | 1.1 | 58 | $\Delta T = 35$ $T_1 = 30$ $T_2 = 70$ | 20 |
| 3 | methanol solution (1.0) | 450 | 1.2 | 1.4 | 30 | $\Delta T = 35$ $T_1 = 30$ $T_2 = 70$ | 25 |
| 4 | methanol solution (3.0) | 150 | 0.6 | 0.7 | 200 | $\Delta T = 39$ $T_1 = 30$ $T_2 = 80$ | 10 |
| 5 | methanol solution (10.0) | 450 | 1.2 | 1.4 | 30 | $\Delta T = 35$ $T_1 = 30$ $T_2 = 70$ | 25 |
| 6 | methanol solution (10.0) *1 | 450 | 1.2 | 1.4 | 30 | $\Delta T = 35$ $T_1 = 30$ $T_2 = 70$ | 25 |
| 7 | methanol solution (10.0) *2 | 450 | 1.2 | 1.4 | 30 | $\Delta T = 35$ $T_1 = 30$ $T_2 = 70$ | 25 |
| 8 | methanol solution (10.0) *3 | 450 | 1.2 | 1.4 | 30 | $\Delta T = 35$ $T_1 = 30$ $T_2 = 70$ | 25 |
| 9 | methanol solution (10.0) *4 | 450 | 1.2 | 1.4 | 30 | $\Delta T = 35$ $T_1 = 30$ $T_2 = 70$ | 25 |
| 10 | methanol solution (1.0) *5 | 450 | 1.2 | 1.4 | 30 | $\Delta T = 35$ $T_1 = 30$ $T_2 = 70$ | 30 |
| Comparison measurements | initial characteristic immediately after aging (the cathod feed gas is air): $ref_1$ | | | | | | 25 |
| | characteristic after 100-hour continuous power generation (the cathod feed gas is air): $ref_3$ | | | | | | 10 |
| | initial characteristic immediately after aging (the cathod feed gas is pure oxygen): $ref_2$ | | | | | | 30 |
| | characteristic after 100-hour continuous power generation (the cathod feed gas is pure oxygen): $ref_4$ | | | | | | 12 |

*1 Sample 6 uses a mixture of (1% oxygen + remaining nitrogen) as the cathod feed gas in current forcing, and air as the cathod feed gas in DMFC power generation characteristic assessment.
*2 Sample 7 uses a mixture of (0.1% oxygen + remaining nitrogen) as the cathod feed gas in current forcing, and air as the cathod feed gas in DMFC power generation characteristic assessment.
*3 Sample 8 uses a mixture of (0.01% oxygen + remaining nitrogen) as the cathod feed gas in current forcing, and air as the cathod feed gas in DMFC power generation characteristic assessment.
*4 Sample 9 uses a mixture of (0.001% oxygen + remaining nitrogen) as the cathod feed gas in current forcing, and air as the cathod feed gas in DMFC power generation characteristic assessment.
*5 Sample 10 uses pure oxygen as the cathod feed gas in current forcing, and DMFC power generation characteristic assessment.

Samples 1 and 4 exhibit little output characteristic recovery effect. This is considered to be because in the current forcing conditions of samples 1 and 4, the current density $J_e$ and applied voltages $V_1$ and $V_2$ are small, which results in insufficient electrolysis of the water. On the other hand, it is seen that samples 2, 3 and 5-10 exhibit substantially the recovery to the initial characteristic outputs immediately after the aging.

(4) Current Forcing Experiment 2

In accordance with the same procedure as (2) above, using air as the cathode feed gas, aging is followed by 100 hour-continuous power generation, so that a cell (sample 11) whose characteristic is degraded is fabricated. Using the sample 11, this current forcing experiment is performed. A DC power supply is prepared. The anode electrode of the DMFC is connected to a positive terminal of the DC power supply output, while its cathode electrode is connected to a negative terminal of the DC power supply output. Current is forced to flow in the same direction as that during normal power generation (current forcing order: 1). Subsequently, by reverse connection, current is forced to flow in the reverse direction to a direction during normal power generation (current forcing order: 2). Further, for one cell (sample 11), by changing the conditions in order shown in Table 2, current forcing is performed continuously (current forcing order: 3 and 4). The number of times of current forcing is three in only the first conditions (current forcing order: 1; +450 mA/cm²; 30 sec), and one in the subsequent current forcing conditions. Using a methanol solution (1.0 mol/l) as the anode feed solution and air as the cathode feed gas, the experiment is implemented by forcing each of them to circulate. For each current forcing order, the DMFC power generation characteristic is assessed in the same manner as in "current forcing experiment 1". The anode feed solution and the cathode feed gas in the assessment are in the same conditions as in current forcing. The assessment results are shown in Table 2.

TABLE 2

Assessment results of the characteristic recovery experiment

| Current-forcing order | Current-forcing conditions | | DMFC power generation characteristic (25° C.) maximum output (mW/cm$^2$) |
|---|---|---|---|
| | current density $J_e$ (mA/cm$^2$) | current flow time t (sec) | |
| 0 | characteristic after 100-hour continuous power generation | | 5 |
| 1 | +450 | 30 | 15 |
| 2 | −450 | 30 | 20 |
| 3 | −700 | 15 | 20 |
| 4 | +700 | 15 | 25 |

+: the same direction as a direction in normal power generation
−: the reverse direction to a direction in normal power generation From Table 2, it is seen that current forcing in the reverse direction to a direction during normal power generation (current forcing order: 2 and 3) exhibits little effect of the invention.

(5) Current Forcing Experiment 3

As another embodiment, in accordance with the same procedure as (2) above, using air as the cathode feed gas, aging is followed by 100 hour-continuous power generation, so that a cell (sample 12) whose characteristic is degraded is fabricated. Using the sample 12, this current forcing experiment is performed. Using a methanol solution (1.0 mol/l) as the anode feed solution and a nitrogen gas containing 1% of oxygen as the cathode feed gas, the experiment is implemented by forcing each of them to circulate. The other current forcing conditions are the same as those of "current forcing experiment 2" (Current forcing order 4 is omitted). For each current forcing order, the DMFC power generation characteristic is assessed in the same manner as in "current forcing experiment 1". In the power generation characteristic assessment using air as the cathode feed gas, measurements are made after the cathode feed gas in the current forcing that is the nitrogen gas containing 1% of oxygen is sufficiently replaced with air. Also, in current forcing after the power generation characteristic assessment, measurements are made after the cathode feed gas that is the air is sufficiently replaced with a nitrogen gas containing 1% of oxygen. The assessment results are shown in Table 3.

TABLE 3

Assessment results of the characteristic recovery experiment

| Current-forcing order | Current-forcing conditions | | DMFC power generation characteristic (25° C.) maximum output (mW/cm$^2$) |
|---|---|---|---|
| | current density $J_e$ (mA/cm$^2$) | current flow time t (sec) | |
| 0 | characteristic after 100-hour continuous power generation | | 5 |
| 1 | +450 | 30 | 15 |
| 2 | −450 | 30 | 25 |
| 3 | −700 | 15 | 25 |

+: the same direction as a direction in normal power generation
−: the reverse direction to a direction in normal power generation While "current forcing experiment 2" using air (oxygen concentration=21%) as the cathode feed gas shows that current forcing in the reverse direction results in little characteristic recovery effect, it is verified from Table 3 that this embodiment reducing the oxygen concentration of the cathode feed gas to 1% has the power generation characteristic recovery effect even in the reverse current forcing.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A fuel cell characteristic recovery method, comprising the steps of:
    feeding an anode electrode of a fuel cell with pure water or a solution;
    feeding a cathode electrode of the fuel cell with an oxygen-containing gas; and
    forcing current to flow between the electrodes using a DC (direct current) power supply with a current density of 300-3000 mA/cm$^2$ in the same direction as a direction of current flow during power generation of the fuel cell.

2. The fuel cell characteristic recovery method according to claim 1, wherein:
    the step of forcing current to flow is performed until before the MEA (membrane electrode assembly) temperature of the fuel cell reaches 100° C., or until before the maximum applied voltage per cell of the fuel cell reaches 3 V.

3. The fuel cell characteristic recovery method according to claim 1, wherein:
    the oxygen-containing gas is pure oxygen, air, or a nitrogen gas containing 0.001-1% of oxygen.

4. The fuel cell characteristic recovery method according to claim 1, wherein:
    the fuel cell is a DMFC (direct methanol fuel cell).

5. The fuel cell characteristic recovery method according to claim 1, wherein:
    the current density is 350-2000 mA/cm$^2$.

6. The fuel cell characteristic recovery method according to claim 1, wherein:
    the current density is 400-1500 mA/cm$^2$.

7. The fuel cell characteristic recovery method according to claim 1, wherein:
    the current density is 450-1400 mA/cm$^2$.

* * * * *